(12) United States Patent
Peteln

(10) Patent No.: US 6,375,717 B1
(45) Date of Patent: Apr. 23, 2002

(54) APPARATUS AND METHOD FOR WET FILTERING MACHINE EXHAUST

(75) Inventor: Erich Peteln, Felixdorf (AT)

(73) Assignee: PDH International Incorporated Georgia corporation ( * ) Notice: Subject to any disclaimer, the term of this patent is extended or adjusted under 35 U.S.C. 154(b) by 0 days.

(21) Appl. No.: 09/569,819

(22) Filed: May 12, 2000

(51) Int. Cl.[7] .............................................. B01D 47/14
(52) U.S. Cl. .............................. 95/211; 96/274; 96/296
(58) Field of Search ..................... 95/210, 211; 96/296, 96/290, 274, FOR 121, FOR 123

(56) References Cited

U.S. PATENT DOCUMENTS 1,989,773 A   2/1935  Snow
3,324,630 A * 6/1967  Teller et al. ................... 95/211
3,748,828 A * 7/1973  Lefebvre ....................... 95/211
3,791,102 A * 2/1974  Huntingdon .................. 95/211
3,957,464 A * 5/1976  Teller ........................... 95/211

FOREIGN PATENT DOCUMENTS

DE           328826      11/1920
EP          0 267 697     5/1988

* cited by examiner

*Primary Examiner*—Duane S. Smith
(74) *Attorney, Agent, or Firm*—Smith, Gambrell & Russell, LLP; Eric J. Hanson; Herbert M. Hanegan

(57) ABSTRACT

A method and apparatus for wet filtering machine exhaust with a desirable scented oil mixture is disclosed. Preferably, the machine exhaust filtered is the exhaust from office machines, such as printers, photocopiers, and facsimile machines, which expel ozone, particulate matter, and toner pollution into the ambient air.

12 Claims, 3 Drawing Sheets

APPARATUS AND METHOD FOR WET FILTERING MACHINE EXHAUST

BACKGROUND

During the process of printing, laser printers and copy machines produce a gas called ozone. Health problems associated with ozone gas pollution include headaches, eye irritation, nose irritation, throat irritation and dryness to the eyes, nose and throat. In addition to ozone gas, toner dust and particulate matter can present further health risks to office machine users.

Most existing office machines are equipped with filters to alleviate the adverse affects of air pollution. However, a printer's or copy machine's temperature may rise by over 10% due to filter clogging. The clogged filter also makes the fan slow down due to reduced air flow, which in turn can produce increased printed page defects and also increase the danger of major components failing.

Although periodic filter replacement can cut down on the health risks and adverse financial impact associated with office machine air pollution, many filters are not easily accesible to non-technicians. Further, because saturated and clogged filters cause machine breakdown, many persons simply remove a machine filter rather than properly replacing it. As a result, many office machines have no filters, increasing air pollution and the risks associated with the pollution.

An associated effect of office machine air pollution is the adverse smell of the machine exhaust. In conjunction with the expulsion of ozone gas and particulates, the exposure to such smells can have deleterious health effects on users.

Consequently, there is a need for a filter device for office machines that is easily replaceable by the machine users. Further, there is a need to eliminate adverse smells associated with office machine exhaust.

Accordingly, the present invention answers these needs by providing a wet filter apparatus and method for filtering office machine exhaust, and providing a more desirable scent to users.

SUMMARY OF THE INVENTION

The present invention provides an apparatus and method for filtering office machine exhaust to reduce health-risks to users and internal damage to machines.

The present invention further provides an apparatus and method for filtering office machine exhuast that can be used by machine users that are non-technicians.

An aspect of the present invention is a wet filtering apparatus and method for limiting the expulsion of ozone and toner and particulate pollutants from office machines into the ambient air.

A further aspect of the present invention is the conducting of ethereal oils along a foam filter stick to remove air pollutants from office machine exhaust.

A further aspect of the present invention is to provide desirable scented oils to control adverse smells from office machine exhaust.

DETAILED DESCRIPTION OF THE INVENTION

The present invention relates to an apparatus and method for wet filtering machine exhaust. In the preferred embodiment of the present invention, an apparatus and method for filtering the exhaust of office machines, such as copiers, printers, and facsimile machines, with oil conducted along a filter medium is disclosed. Although the present invention is described with regard to filtration of office machine exhaust, those of ordinary skill in the art will appreciate that the present invention is adaptable to variety of machines in which gas and particulate pollutants are desirably filtered from entering the ambient air.

In the preferred embodiment, a filter apparatus of the present invention includes three main parts: (i) a housing with filter sticks; (ii) two oil containers, one for delivering oil along the filter sticks and the other for receiving the delivered oil; and (iii) a wide range of ethereal oils provided with desired scents.

Figure 1:
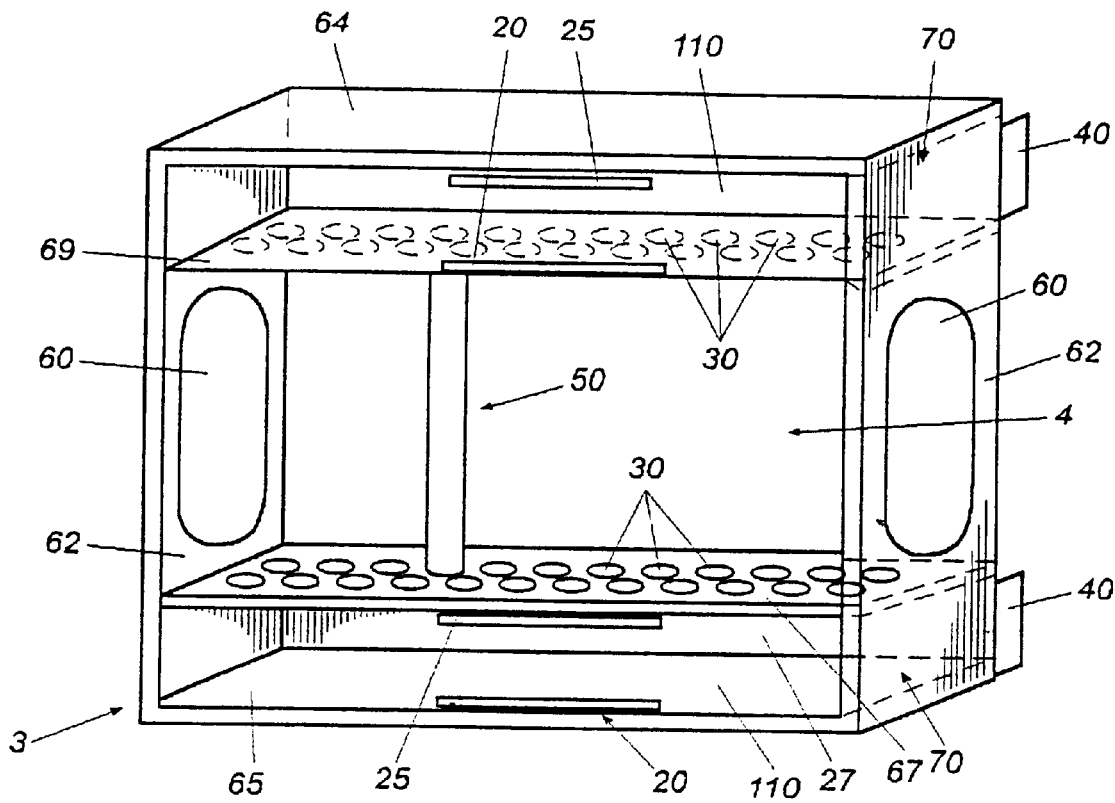
FIG. 1 is a perspective view of the filter of the present invention illustrating the filter housing without filter sticks.

Referring to FIG. 1, a filter housing (3) of the filter apparatus of the present invention is disclosed. Preferably the housing is of rectangular shape with two side walls (62), a top wall (64), and a bottom wall (65). The housing preferably comprises heat-resistant plastic, which is able to withstand a temperature of at least 60° Celsius. Although the external appearance of the housing is preferably rectangular, the housing may be square, rectangular, round, or custom-shaped based on the exhaust opening of a machine which the filter apparatus covers.

Adjacent to each of the upper top and bottom walls are preferably two oil container holding areas (110). Each of the holding areas preferably includes a back wall (27). A catch opening (25) is preferably provided along each of the back walls (27) for receiving a catch from the oil container. A locking projection (20) is further preferably provided along the bottom face of each of the holding areas for locking the respective oil containers in place. At the base of the upper holding area a holding area base plate (69) is provided with a plurality of housing filter stick openings (30). Similarly, the bottom holding area is enclosed by a base plate (67) with a plurality of housing filter stick openings (30).

Each filter stick opening (30) of base plate (69) has a corresponding filter stick opening in parallel base plate (67). The filter stick's filtering section (4), the area between parallel base plates (67) and (69), preferably comprises a plurality of filter sticks (50) for conducting oil from the openings (30) in base plate (69) to the corresponding openings (30) in base plate (67).

In each of the side walls (62) an air outflow opening (60) is provided. In order to preclude the fundamental overheating of a machine, an oblong exhaust slit is preferably located on the left and right side of the housing. The exhaust slits preferably prevent excess pressure in the filter itself, since, as a result of them, the backed up or excessively produced air quantities have the possibility of being able to exit on both sides.

Preferably, one or more brackets (40) attach a side wall (62) to an office machine. The filter apparatus is preferably secured with filtering section (4) placed in front of the exhaust of the office machine. As a result of the different sizes of various ventilators, the exhaust openings of machines are of different sizes as well. In other words, the housing of a filter must be adjusted to the size of the exhaust openings, in order to receive the original air quantity flow of the machine. Otherwise, an overheating of the internal chamber of the machine could result.

The attachment bracket (40) may be a single bracket or a plurality of brackets on any one or more of the walls of the housing, depending on the machine to which the filter apparatus is attached. Housing attachments, in any form, are primarily based on the respective type of machine to which the housing is to be applied. As a result, the attachment bracket contemplates a variety of attachment means, including plastic brackets and click systems.

Preferably, in right side wall (62) an upper and lower oil container opening (70) is provided for insertion and removal of the oil containers.

Figure 8:
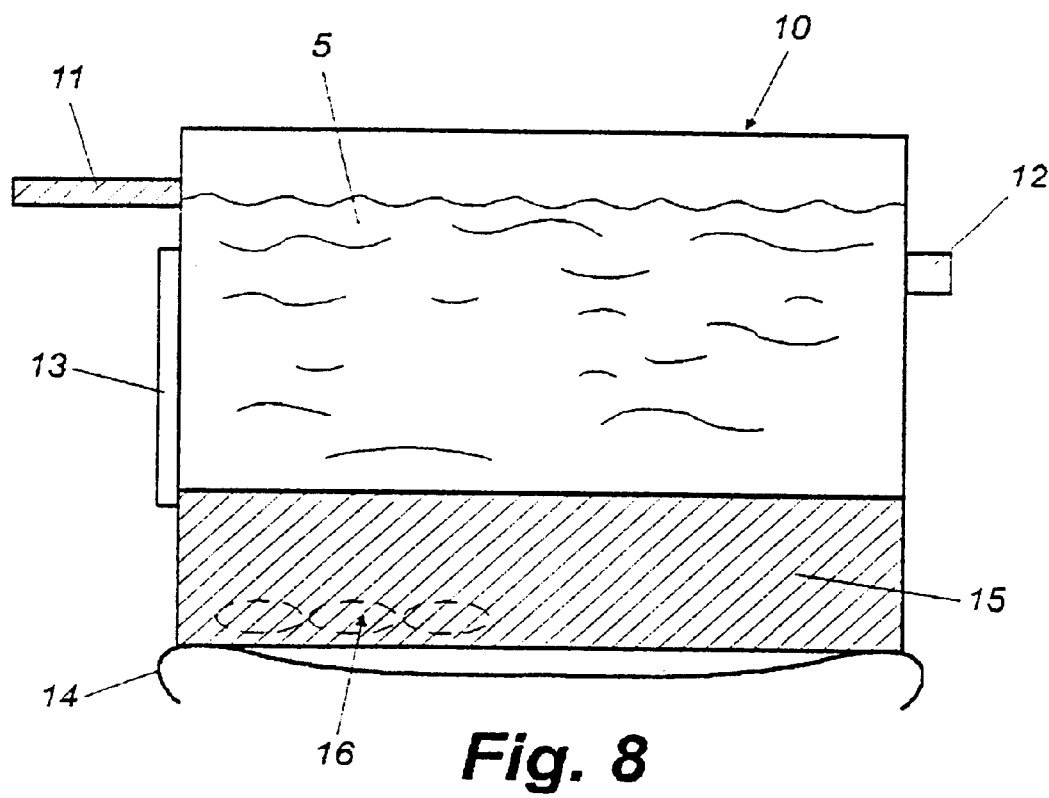
FIG. 8 is a cross-sectional side view of an oil container containing oil in the filter apparatus of the present invention.

Referring to FIG. 8, an oil container (10) filled with oil (5) is disclosed. The oil container preferably includes a bottom face, a left and right face, and a front and back face. The top of the container is preferably open for filling the container with oil out of the filter housing. When placed in the filter housing, a container is either closed by top wall (64) or base plate (67), depending on whether the container is an upper or lower container. In an alternative embodiment an oil filling device may be integrated with the housing and an upper oil container without removing the container from the housing.

The bottom face of the oil container preferably includes a plurality of oil flow openings (16). An oil pad (15) preferably covers the openings to slow and control the flow of oil (5) to the openings (16). In the preferred embodiment, the bottom third is filled by the pad (15), which is preferably a rubber foam pad.

On the back face of the oil container, a catch (12) is preferably attached. The front face of the oil container preferably includes a grip rail (11) for sliding the oil container in and out of the filter housing. A viewing glass (13) is also preferably provided on the front face of the oil container for a user to examine the remaining oil level.

The bottom of the oil container preferably includes one or more locking clips to secure the oil container at the locking clip projection (20) of the housing.

Preferably, the locking clips also receive a rubber closure for closing the flow openings (16). The rubber closure preferably slides between the locking clips (14) and can be inserted or removed as needed to prevent or allow the flow of oil from the openings.

Figure 2:
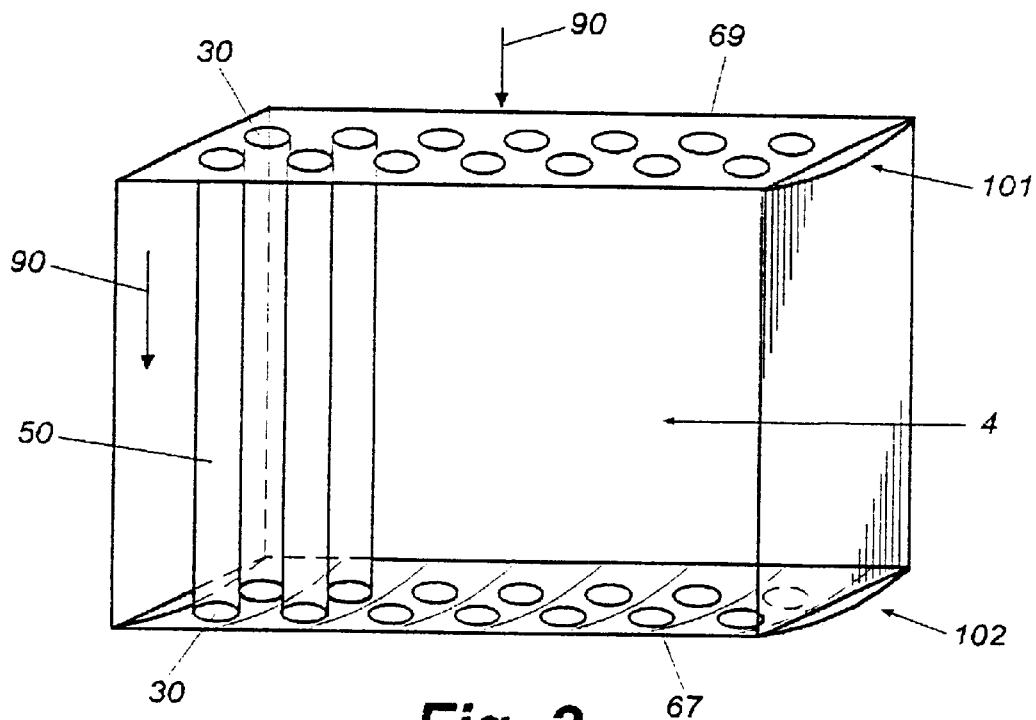
FIG. 2 is a partial top perspective view of the filter sticks filtering section of the filter apparatus of the present invention.
Figure 3:
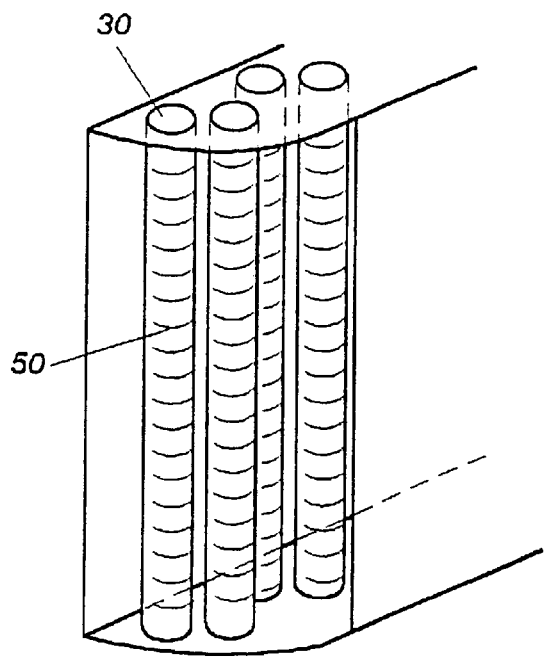
FIG. 3 is a side partial elevational view of the filter sticks filtering section of the filter apparatus of the present invention.

Referring to FIGS. 1, 2, and 8 an oil container (10) filled with oil and without closure (18) is inserted through upper opening (70) into the upper container holding area (110) of the filter housing (3). The oil container catch (12) connects into catch opening (25). Locking clips (14) preferably connect to one or more locking projections (20) by a click locking system to prevent the containers from falling out. The plurality of flow openings (16) are adjacent to filter stick openings (30).

The second oil container (10) initially does not contain oil and includes rubber closure (18) to close the plurality of flow openings (16). The second oil container is inserted into lower holding area (110) of the housing. The open top of the lower oil container is preferably adjacent to the plurality of filter stick openings in base plate (67) of the housing.

Preferably oil (5) in the upper oil container slowly flows through the pad (15) to and through the oil flow openings (16) and into the filter stick openings (30). Gravity causes the oil to flow (90) downward along the plurality of filter sticks (50). The oil continues to flow downward to the filter stick openings (30) in base plate (67). The oil subsequently drips off into the lower oil container.

Figure 7:
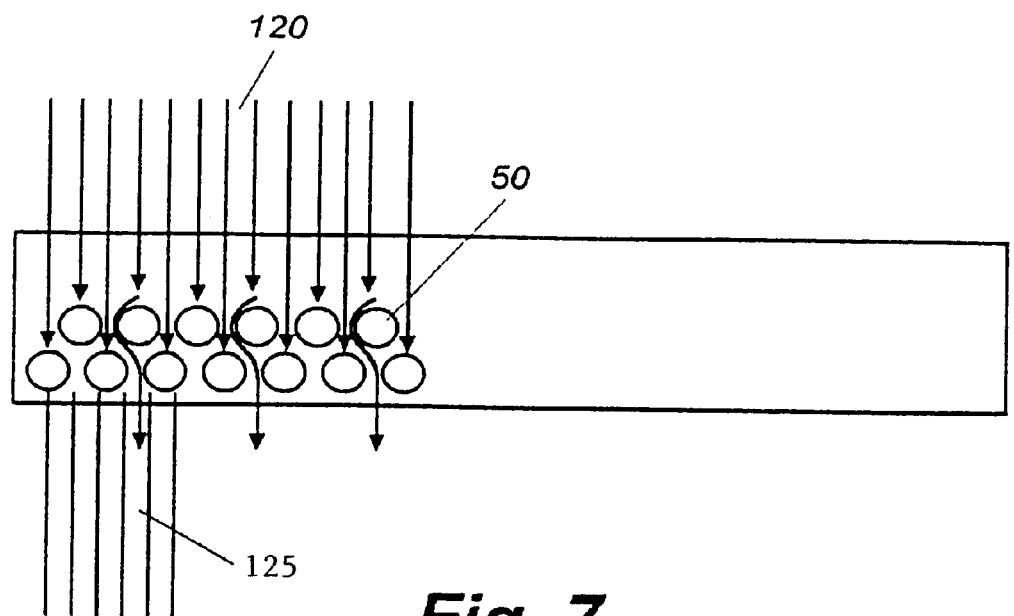
FIG. 7 is top cross-sectional view of the filter sticks filtering section and the associated filtration of polluted air in the filter apparatus of the present invention.

Referring to FIG. 7 exhaust (120) from an office machine blows through the filtering section of the filter apparatus. Ozone particulates, and other pollutants contact the oil along filter sticks (50) and are removed from the exhaust. Filtered air (125) flows out of the filtering section (4) and into the ambient air from the filter apparatus.

Figure 6:
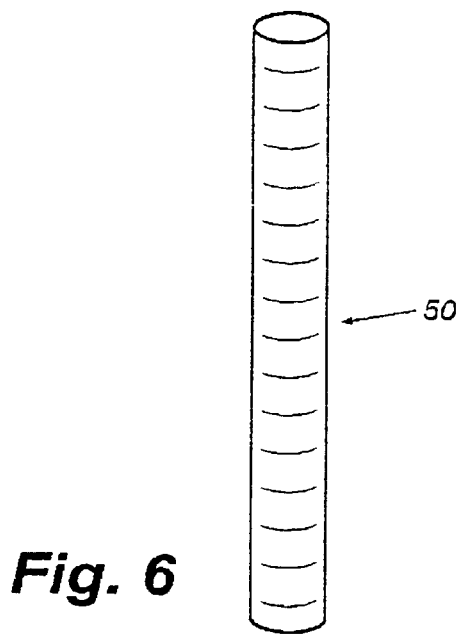
FIG. 6 is a perspective view of a filter stick of the filter apparatus of the present invention.

Referring to FIG. 6, the filters sticks (50) are preferably round, perpendicularly standing foam rubber rods of approx. 5–6 mm in diameter and a perforated plastic surface which are perpendicular and staggered to one another. In alternative embodiments the filter sticks may be of various shapes including oval, square, rectangular, triangular, and other shapes.

The filter sticks, or foam rubber rods, are preferably a fixed component and are attached to the housing at the corresponding filter stick openings in base plates (67) and (69). The filter sticks are also preferably perpendicular in order to enable the automatic flow of oil by gravity. The filter sticks are further preferably staggered, in order to force the outflowing air quantities to flow around the foam rubber rods. The distance from one foam rubber rod to another preferably is no greater than 2 mm.

Figure 4:
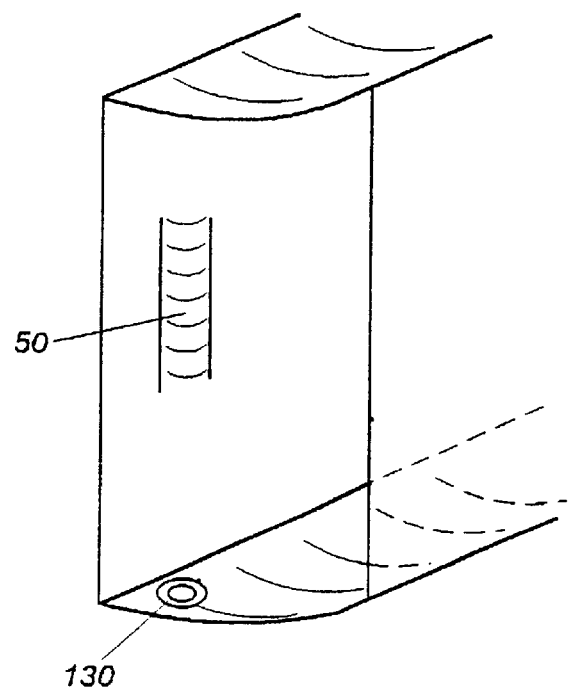
FIG. 4 is a side partial elevational cut-away view of the filter apparatus of the present invention showing a security ring and a filter stick's relationship therewith.
Figure 5:
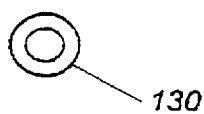
FIG. 5 is a top perspective view of a security ring of the filter apparatus of the present invention.

Referring to FIGS. 4 and 5 a security ring (130) is provided in the preferred embodiment to maintain the distance between the filter sticks. The filter sticks are preferably maintained perpendicular to base plates (67) and (69), and parallel to one another.

The foam rubber material of the filter sticks preferably prevents a rapid flow of oil from the full upper oil container into the lower empty oil container. In addition, the individual foam rubber rod is preferably mechanically strengthened internally by the perforated plastic surface (simultaneously a mechanical protection against external damage, such as during cleaning). The perforation permanently allows low moisture on the external surface of the rods. As a result of this surface moisture, microscopically small particles which are located in the exhaust flowing out of a machine by means of ventilators are preferably captured and deposited on the external cover of the foam rubber rods (the finest toner particles, oil residues, silicones, oils of all types, as well as dust and environmental air pollution).

Referring to FIG. 2, around these filter sticks there are light channels (101) and (102) along the respective length of base plates (67) and (69). The channels prevent possible outflow of the ethereal oil during a change of the oil containers.

In a preferred embodiment, the oil (5) is ethereal oil, which may have a desired scent. As the pollutants are removed by the oil flowing along the filter sticks, the desired scent from the ethereal oil is provided into the air by the warm air from the exhaust of an office machine. Accordingly, both filtration and a desirable scent are achieved by the filter apparatus.

In the preferred embodiment of a method of the present invention, an oil container is filled with ethereal oil of a desirable scent and placed in the upper oil container holding area. A second, empty oil container is placed into the lower container holding area. Each of these oil containers preferably comprises heat-resistant and acid-resistant and mechanically solid plastic.

The internal construction of each container, full or empty, is preferably the same. In order to prevent the oil which is contained in the container from being able to flow out too quickly, the lower part of the interior side of the container is designed with a foam rubber pad (along the entire length and over all openings into which the foam rubber rods lock). This foam rubber pad preferably fills approximately the lower third of the entire container and will draw the ethereal oil, but only slowly allow it to pass through to the foam rubber rods.

In the preferred embodiment, once the upper oil container is essentially empty, and the lower container has received the flowing oil, the containers may be switched. Preferably the closure on the lower container is removed, opening the oil flow openings, and the lower container is inserted into the upper container holding area. The closure is inserted at the base of the empty upper container, thereby closing the oil openings, and the empty container is inserted into the lower holding area. Preferably, this process may be repeated for up to three months, depending on the rate of loss of the ethereal oil mixture.

In a further embodiment, the filter sticks are preferably washable. The filter apparatus may be removed from the machine and washed with a cleansing agent, such as water, to remove the pollutants which build-up on the filter sticks.

In an alternative embodiment, the filter housing may be discarded, and a filter apparatus with fresh filter sticks may be attached at desired filter-changing intervals for the office machine.

Ethereal oils have very good properties for controlled flow and filtering. Preferably lime-free normal water may be added to ethereal oil to achieve desired flow rates and filtering reactions. Those of ordinary skill in the art will appreciate that the ratio of oil and water mixture is determined based on parameters such as humidity, temperature, evaporation rate, scent of oil, rate of exhaust flow, and type of filter sticks.

While the invention has been described with reference to the structures and methods disclosed, it is not confined to the details set forth but is intended to cover such modifications or changes as may fall within the scope of the following claims.

What is claimed is:

1. An apparatus for wet filtering machine exhaust comprising:
    a) a plurality of filter sticks for filtering machine exhaust;
    b) an upper oil mixture delivery container containing an oil mixture;
    c) a plurality of oil openings in the base of said upper oil mixture delivery container for said oil mixture to flow to said plurality of filter sticks;
    d) a lower oil mixture receiving container for receiving the oil mixture at the base of said plurality of filter sticks, wherein said upper oil mixture delivery container is interchangeable with said lower oil mixture receiving container; and
    e) attachment means for attaching said plurality of filter sticks to a machine in the line of flow of the machine exhaust.

2. The apparatus of claim 1 wherein said upper oil mixture delivery container includes a foam pad to control the flow of oil to said plurality of oil openings.

3. The apparatus of claim 2 wherein said oil mixture includes scented ethereal oil.

4. An apparatus for wet filtering machine exhaust comprising:
    a) filtering means for filtering machine exhaust;
    b) means for conducting an oil mixture gravitationally along said filtering means to contact said machine exhaust with said oil mixture;
    c) attachment means for attaching said filtering means to a machine in the line of flow of the machine exhaust; and
    d) a filter housing fixedly connected to said attachment means, said housing including at least one auxiliary airflow opening for relieving excess air pressure and heat from the machine exhaust.

5. An apparatus for wet filtering machine exhaust comprising:
    a) filtering means for filtering machine exhaust;
    b) means for conducting an oil mixture gravitationally along said filtering means to contact said machine exhaust with said oil mixture; and
    c) attachment means for attaching said filtering means to a machine in the line of flow of the machine exhaust, wherein said machine exhaust is exhaust from an office machine.

6. The apparatus of claim 5 wherein said office machine is selected from the group consisting of a printer, photocopier, and facsimile machine.

7. A method for wet filtering machine exhaust comprising:
    a) attaching a filter to a machine in the line of flow of exhaust from the machine; and
    b) conducting an oil mixture gravitationally along said filter to contact said machine exhaust, wherein said oil mixture includes a scented ethereal oil.

8. The method of claim 7 wherein said filter includes a plurality of filter sticks.

9. The method of claim 8 wherein the oil mixture of step (b) is conducted from a delivery container, and further comprising:
    a) receiving said oil mixture which has contacted said exhaust from said plurality of filter sticks in a receptacle; and
    b) interchanging said receptacle containing said oil mixture with said delivery container whereby said receptacle becomes said delivery container and said delivery container becomes said receptacle.

10. A method for wet filtering machine exhaust comprising:
    a) attaching a filter to a machine in the line of flow of exhaust from the machine, wherein said exhaust is exhaust from a machine selected from the group consisting of a printer, photocopier, and facsimile machine; and
    b) conducting an oil mixture gravitationally along said filter to contact said machine exhaust.

11. The method of claim 10 wherein said filter includes a plurality of filter sticks.

12. The method of claim 8 wherein said exhaust is exhaust from a machine selected from the group consisting of a printer, photocopier, and facsimile machine.

* * * * *